(12) United States Patent
Long

(10) Patent No.: US 6,508,925 B2
(45) Date of Patent: Jan. 21, 2003

(54) AUTOMATED BRUSH PLATING PROCESS FOR SOLID OXIDE FUEL CELLS

(75) Inventor: Jeffrey William Long, Pittsburgh, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 19 days.

(21) Appl. No.: 09/822,388

(22) Filed: Mar. 30, 2001

(65) Prior Publication Data

US 2002/0139681 A1 Oct. 3, 2002

(51) Int. Cl.[7] ................................................. C25D 5/06
(52) U.S. Cl. ...................... 205/117; 205/118; 205/151
(58) Field of Search ............................. 429/31; 205/117, 205/118, 151; 204/224 R

(56) References Cited

U.S. PATENT DOCUMENTS

| | | |
|---|---|---|
| 4,220,504 A | 9/1980 | Hanley et al. |
| 4,490,444 A | 12/1984 | Isenberg |
| 4,648,945 A | 3/1987 | Isenberg |
| 5,225,059 A | 7/1993 | Penrose |
| 5,324,406 A | 6/1994 | Anderson et al. |
| 5,391,440 A | 2/1995 | Kuo et al. |
| 5,409,593 A | 4/1995 | Moskowitz |
| 5,516,597 A * | 5/1996 | Singh et al. .................. 429/30 |
| 6,402,925 B2 * | 6/2002 | Talieh ................... 204/224 M |

OTHER PUBLICATIONS

Groshart, Earl ("Brush Plating Techniques", Metal Finishing Guidebook Directory, vol. 86, No. 1A, Jan. 1988).*

* cited by examiner

Primary Examiner—Nam Nguyen
Assistant Examiner—Wesley A. Nicolas

(57) ABSTRACT

A method of depositing a metal coating (28) on the interconnect (26) of a tubular, hollow fuel cell (10) contains the steps of providing the fuel cell (10) having an exposed interconnect surface (26); contacting the inside of the fuel cell (10) with a cathode (45) without use of any liquid materials; passing electrical current through a contacting applicator (46) which contains a metal electrolyte solution; passing the current from the applicator (46) to the cathode (45) and contacting the interconnect (26) with the applicator (46) and coating all of the exposed interconnect surface.

11 Claims, 3 Drawing Sheets

AUTOMATED BRUSH PLATING PROCESS FOR SOLID OXIDE FUEL CELLS

GOVERNMENT CONTRACT

The Government of the United States of America has certain rights in this invention pursuant to Contract No. DE-FC26-97FT-34139 awarded by the U.S. Department of Energy.

BACKGROUND OF THE INVENTION

1. Field of the Invention

This invention relates to solid oxide fuel cells (SOFC) and to methods for plating their interconnections.

2. Background Information

A solid oxide fuel cell is an electrochemical cell that burns a fuel to generate heat and electricity. In one embodiment, the fuel cell consists of a multilayered tube that is electrically connected to other tubes. The electrical connection between the cells can be made through a ceramic interconnection or a segment of anode (fuel electrode) material, a nickel-zirconia cermet or cobalt zirconia cermet material, which coats the interconnection as taught, for example, by U.S. Pat. No. 4,490,444 (Isenberg). Many times the interconnection is applied by plasma spraying techniques. Such techniques can provide some leakage and lack of thermal stability. U.S. Pat. No. 5,391,440 (Kuo et al.), which also utilized a fuel electrode material coating on the interconnection, taught using a flux added mixture of $LaCrO_3+Cr_2O_3+(CaO)_{12}.(Al_2O_3)_7$-flux- as a plasma arc spraying feed to form the interconnection, to provide leak proof, dense, stable interconnections.

In between the interconnection of one cell (or the fuel electrode material covering the interconnection of one cell) and the fuel electrode of another cell there is usually a spongy nickel felt. The nickel felt permits electrical contact between the two cells to be maintained during cell expansion and contraction which occurs as the cells are heated and cooled. Isenberg, in U.S. Pat. No. 4,648,945 found, however, that the electrical connection between the spongy nickel felt and the interconnection is sometimes poor, which increases the resistance of the cell connections and reduces the efficiency of connected cells. If fuel electrode material covers the interconnection, the poor electrical connection is between the interconnection and the fuel electrode material. Attempts to solve this problem by applying a deposit of nickel on top of the interconnection by conventional techniques, such as sputtering or plasma spraying, were not acceptable processes because they were uneconomical or introduce stresses into the cell structure.

Isenberg, in the above-described '945 Patent, taught an elaborate process to solve the electrical connection problem involving masking the outside surface of a hollow tubular fuel cell so that only the interconnection was exposed, and then immersing a tubular hollow fuel cell in electrolyte solution containing the ions desired to deposit on the interconnection, such as nickel acetate, with a graphite bar placed inside the tube along with ammonium tartrate solution. D.C. current was then passed from the graphite bar to the outer fuel electrode anode to deposit metal on the interconnection. However, this process required manually intensive techniques to electroplate specific areas of the interconnection and necessitated that each cell/contact assembly be at least partially submerged into the electrolyte. The prior art technique deposits metal at any conductive site that is not electrically isolated from the cathode which can result in electrical shorts. In addition, extensive rinsing and cleanup are required to remove electrolyte residue. Also, variability in the physical properties relating to resistivity of the interconnection resulted in areas that did not plate or did not plate sufficiently to meet requirements. One solution was to remove the original plating deposit and reprocess the interconnection through a second electroplating. The other solution involved masking acceptably plated areas and selectively plating non-plated or areas under modified conditions to maintain the desired current density. Both solutions were more labor intensive and required consumable materials.

What is needed is a new and improved plating process for solid oxide fuel cells that can be used to electroplate the entire interconnection and/or replate specific poorly plated areas as necessary in an automated fashion.

SUMMARY OF THE INVENTION

Therefore it is a main object of this invention to provide a process to coat interconnections of solid oxide fuel cells that does not require extensive preparation, rinsing and cleanup; and does not require that solid oxide fuel cells be immersed in electrolyte.

These and other objects of the invention are accomplished by a process characterized by:

(A) providing an axially elongated tubular, hollow fuel cell comprising an outer fuel electrode, an inner air electrode and a solid electrolyte therebetween, where the electrolyte defines an elongated exposed radial segment, said segment containing an electrically conductive interconnect material;

(B) contacting the inside of the fuel cell with a cathode material without use of any liquid medium inside the fuel cell;

(C) passing electrical current through an applicator which contains liquid electrolyte solution containing a metal desired to be deposited on the interconnect material;

(D) passing electric current from the applicator, to the cathode inside of the fuel cell and contacting the interconnect with the electrolyte containing applicator and coating all of the interconnect surface with electrolyte solution so that the passage of electric current will cause metal from the electrolyte solution to coat the surface of the interconnect.

The invention also is characterized by:

(A) providing an axially elongated, tubular, hollow fuel cell comprising an outer fuel electrode, an inner air electrode and solid electrolyte therebetween, and where the electrolyte defines an elongated exposed radial segment, said segment containing a gas impermeable electrically conductive interconnect material in electrical communication with a segment of said inner air electrode; and then (B) contacting the inside of the air electrode with a cathode material without use of any liquid medium inside the fuel cell; and then (C) passing electrical current through an applicator which contains liquid electrolyte solution containing a metal desired to be deposited on the interconnect material; and then (D) passing electric current from the applicator to the cathode contacting the inside of the air electrode; and then (E) contacting a first point of the exposed interconnect with the electrolyte containing applicator and transferring the contact point to deposit electrolyte solution along the elongated axial length of the interconnect to a second point, so that the passage of electric current will cause metal from the electrolyte solution to coat the surface of the elongated axial length of the interconnect.

A plurality of fuel cell interconnects can be processed in this fashion where the applicator, preferably a rotating brush or roller, can be disposed above or below the fuel cells and movement or translation of the brushes or of the fuel cells down the axially elongated length of interconnection can be automatically programmed. This process eliminates use of liquid fluid such as a metal salt inside the fuel cell and dipping the entire exterior of the fuel cell into a container of electrolyte, thus eliminating most clean up problems and manually intensive techniques.

BRIEF DESCRIPTION OF THE DRAWINGS

The above and other advantages of this invention will be more apparent from the following description in view of the drawings, in which.

DESCRIPTION OF THE PREFERRED EMBODIMENTS

Figure 1:
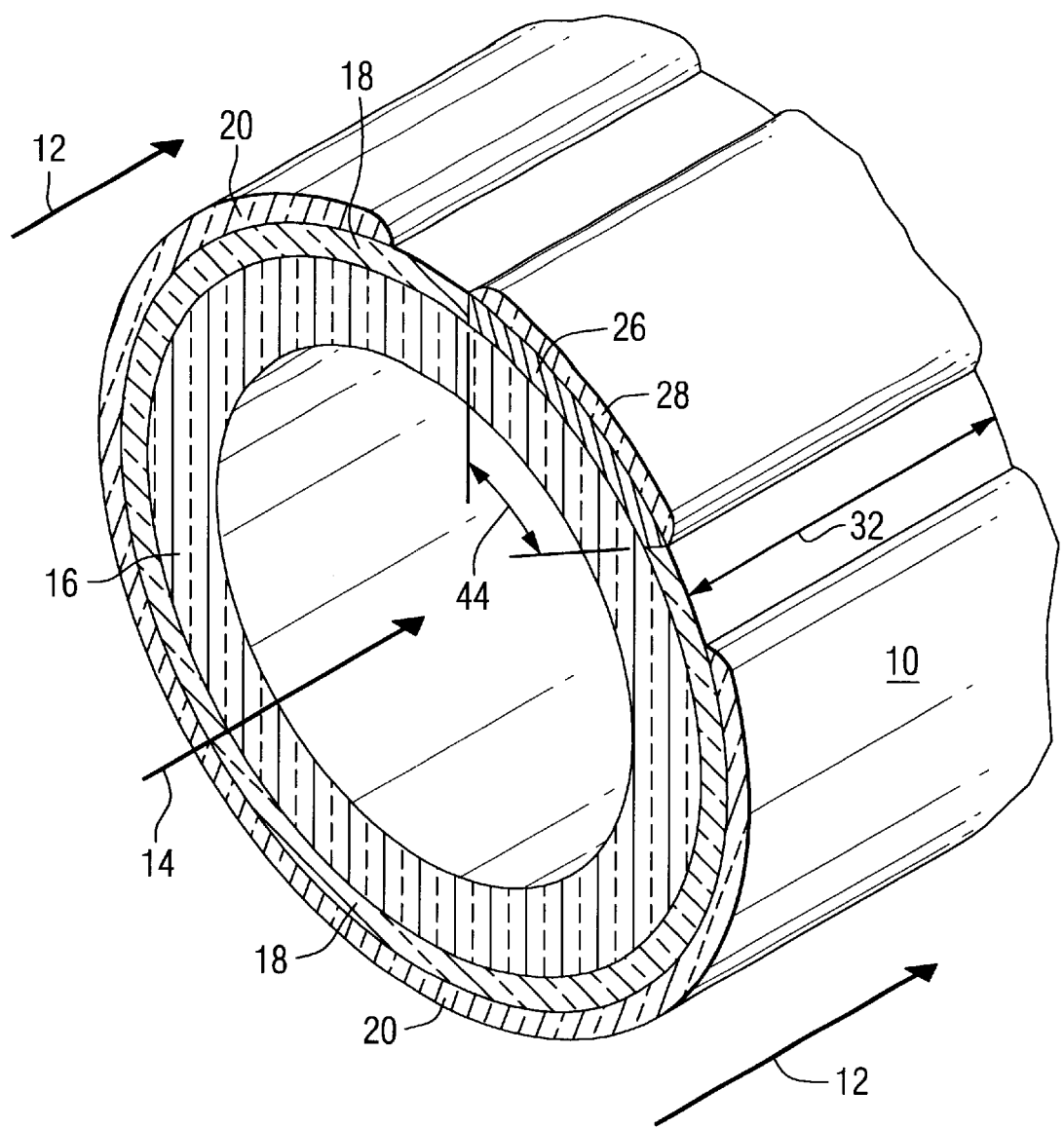
FIG. 1 is a schematic sectional view of an axially elongated, hollow, tubular, solid oxide fuel cell having, in a selected axial segment, an interconnection layer covered by a conducting metallic electroplated layer along its axial length.

Referring to FIG. 1, a preferred, tubular, electrochemical cell 10 is shown. The preferred configuration is based upon a fuel cell system wherein a flowing gaseous fuel, such as hydrogen, from reformed hydrocarbon gases, is directed over the outside of the cell, axially in the embodiment of FIG. 1 in the direction shown by arrow 12. An oxidant, such as air or $O_2$, is directed through the inside of the cell, as shown by arrow 14. Oxygen molecules pass through porous electrically conductive inner air electrode structure 16 and are convened to oxygen ions which pass through an electrolyte 18, to combine with the fuel at an outer fuel electrode 20.

The air electrode or cathode 16 is a porous, usually self-supporting, metal oxide structure approximately 50 micrometers to 2300 micrometers (0.05 millimeter to 2.3 millimeters) thick. The air electrode can be deposited on the support tube by well known slurry dip and sintering techniques, extruded as a self-supporting structure, etc. The air electrode comprises, for example, doped oxides or mixtures of oxides of the perovskite family, such as, $LaMnO_3$, $CaMnO_3$, and the like. Preferred dopants are strontium, calcium, cobalt, nickel, iron, tin, barium, cerium, boron and the like.

A layer of dense, sandwiched, gas-tight solid electrolyte 18 surrounds most of the outer periphery of the air electrode 16 between the air electrode 16 and fuel electrode 20. The electrolyte comprises, for example, yttria stabilized zirconia about 1 micrometer to about 100 micrometers thick (0.001 millimeter to 0.1 millimeter). The electrolyte can be deposited onto the air electrode by well known, high temperature, electrochemical vapor deposition techniques. In the case where the electrolyte is to be deposited before the interconnection material, a selected radial segment or portion 44 of the air electrode 16 is masked during electrolyte deposition to make the electrolyte discontinuous for inclusion of a layer of non-porous, gas-tight, electrically conductive interconnection material 26 which is deposited on this segment or portion 24. If the interconnection material is to be deposited first, then the electrolyte portion of the air electrode is masked initially.

The dense interconnection material 26, which extends the active axial length of each elongated cell 10 as shown, must be electrically conductive in both an oxidant environment and a fuel environment. The term "electrically conductive" as used herein means conducting electrons but not substantially conducting ions. The gas-tight interconnection 26 can be roughly similar in thickness to the electrolyte, approximately 30 micrometers to about 100 micrometers (0.03 millimeter to 0.1 millimeter) thick. The interconnection should be non-porous, namely over about 95% dense and preferably 99% dense (99% of theoretical density). The interconnection material is highly electrically conductive at temperatures of about 1000° C., the usual operating temperature of a solid oxide fuel cell. The interconnection is preferably dense enough to be substantially leak proof and advantageously has a coefficient of thermal expansion close to that of the solid electrolyte and the electrode onto which it is deposited, and the other components, including the support tube, if used. A preferred interconnection material is doped lanthanum chromite ($LaCrO_3$).

An outer fuel electrode or anode 20 substantially surrounds the solid electrolyte 18. The fuel electrode or anode 20 is porous, and can comprise, for example, nickel- or cobalt-zirconia cermet. As shown, the fuel electrode 20 also is discontinuous, being spaced from the interconnection 26 by a distance sufficient to avoid direct electrical communication between the fuel electrode 20 and both the interconnection 26 and the air electrode 16. The fuel electrode is approximately 100 microns (0.1 millimeter) thick. The fuel electrode can be deposited on the electrolyte, for example, by electrochemical vapor deposition techniques, where nickel particles are anchored to the electrolyte surface by a vapor deposited skeleton of electrolyte material.

An electrically conductive top layer 28 is deposited over the interconnection layer 26. This top layer is preferably comprised of electroplated nickel or cobalt, and is about the same thickness, approximately 100 micrometers (0.1 millimeter). The foregoing elements form an electrochemical cell. The interconnection serves as an electrical contact to a fuel electrode of a second electrochemical cell. The electrical connection is made along the axial length of the interconnect through a metal fiber felt (not shown). Each fuel cell is preferably tubular and typically is electrically connected in series with an adjacent fuel cell, although various serial and parallel arrangements are possible. A typical single cell generates an open circuit (unloaded) voltage of about one volt at 1000° C. The electrical power that can be supplied is a function of the dimensions of the cell, the supply of fuel and oxidant temperature, and other factors. Multiple cells can be connected in series and/or parallel to achieve desired levels of voltage and current output from the electrochemical generator as a whole.

The conductive top layer 28 must completely coat and cover the interconnection layer 26 which width is defined along a radial segment 44 by the electrolyte 18, and which layer 26 is in electrical communication with a segment of the inner air electrode. The top layer will preferably be of Ni or Co and will coat segment 44 of the axial length 32 of the interconnect 26, which complete axial length is not shown in FIG. 1.

Figure 2:
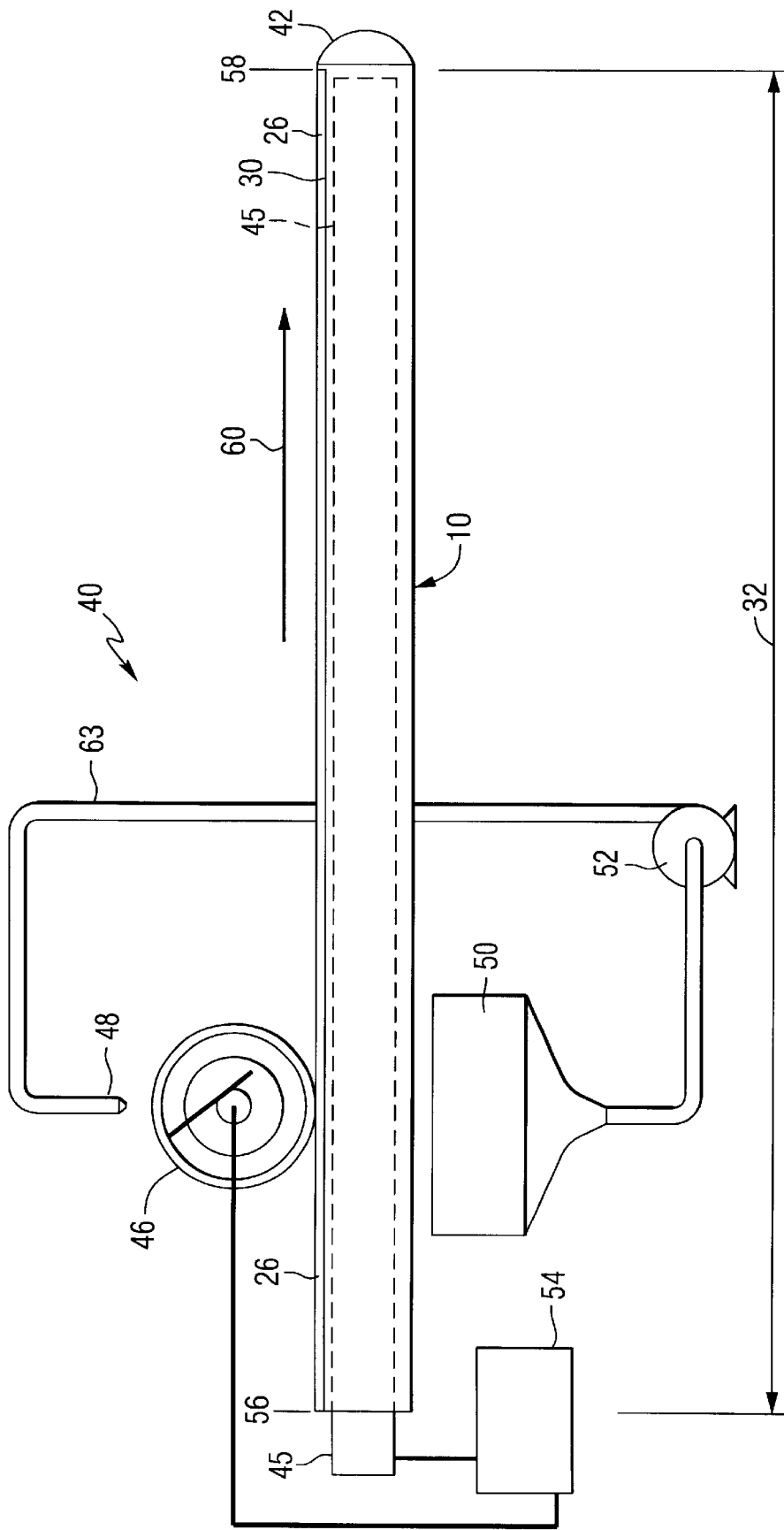
FIG. 2, which describes one method of this invention, is a side view showing one method of this invention, where the fuel cell is disposed horizontally, interconnect side up and an applicator is disposed and moves above the interconnect.

FIG. 2 shows one embodiment of an apparatus 40 used to coat exterior metal layer 28 onto the interconnection 26 along axially elongated radial segment 30, according to the method of this invention. The axially elongated tubular fuel cell 10, generally having a closed or plugged end 42, is provided and usually positioned horizontally within apparatus 40. The fuel cell has a gas impermeable electrically conductive top, exterior interconnect material 26 which is to be coated by apparatus 40.

A cathode 45, preferably generally circular in cross-section, is inserted inside the fuel cell to contact at least that portion, shown as 44 in FIG. 1, of the interior, conducting air electrode in contact with the electrically conducting interconnection. The cathode 45 can include, for example, copper, nickel, iron, stainless steel or preferably an inert material such as graphite.

An applicator, such as a brush, preferably a rotating brush or roller 46 is contacted with liquid electrolyte solution 48, usually from an electrolyte reservoir 50, via a pump 52. The electrolyte solution will contain the metal desired to be deposited by the brush 46 on the interconnections 26, for example nickel acetate, cobalt acetate or nickel sulfamate. While a rotating brush or roller is shown in the Figures, an absorbent, contoured brush, flat brush or sponge material can also be used as the applicator instead, where electrolyte fluid would pass through to contact the interconnection. The term "brush" however, as used herein, is defined to mean these other type applicators. A rotating brush is preferred however, as this provides more uniformity of application.

Occasionally, additional solution will be added to the reservoir 50 to provide for the metal depleted during coating. The temperature of coating can be from ambient, about 25° C., up to about 70° C., preferably from 40° C. to 60° C. in order to provide a well attached coating without repeating the coating step too often.

An electrical current is passed through the rotating brush during coating by rectifier 54, battery or other means, which draws current from the cathode 44. Thus, current passes through the rotating brush 46, the liquid electrolyte solution, the conductive interconnection and the conductive air electrode to the cathode causing electroplating of the metal in the electrolyte solution onto the interconnection. The electrolyte containing brush 46 contacts a first point generally shown here as 56 of the exposed interconnection. The brush 46 is then transferred, moved or translated along the elongated axial length 32 of the exposed interconnect to a second point generally shown here as 58, so that the passage of electric current causes metal from the electrolyte solution to coat the surface of the elongated axial length of the exposed, unmasked interconnect. The initial direction of transfer or translation of brush 46 is shown as 60.

Any excess electrolyte can drain back into the reservoir 50 as shown in this embodiment, where the entire apparatus 40, including the brush 46, reservoir 50 and electrolyte feed lines 63 would travel together. This method shows the fuel cell disposed horizontally, interconnect side up and the applicator is disposed above the interconnect. A plurality of fuel cells could also be coated simultaneously by the apparatus.

Several passes of the brush 46 may be required, where the brush is reversed to coat from point 58 back to point 56 or is brought back to point 56 to recoat again in the direction 60. The deposition should continue until the desired deposit thickness is reached. A thickness of about 3 micrometers to about 15 micrometers is desirable as a thinner deposit may not cover all of the interconnection and a thicker deposit may tend to flake off.

The amperage and voltage of the direct current used is important. A good procedure is to calculate the number of coulombs required to deposit a coating of the desired thickness and then adjust the time accordingly, to maintain the desired current density. The current density should be adjusted, as is known in the art, to avoid excessive gassing at the deposit as that may produce deposits that are excessively brittle and/or poorly adhering.

Figure 3:
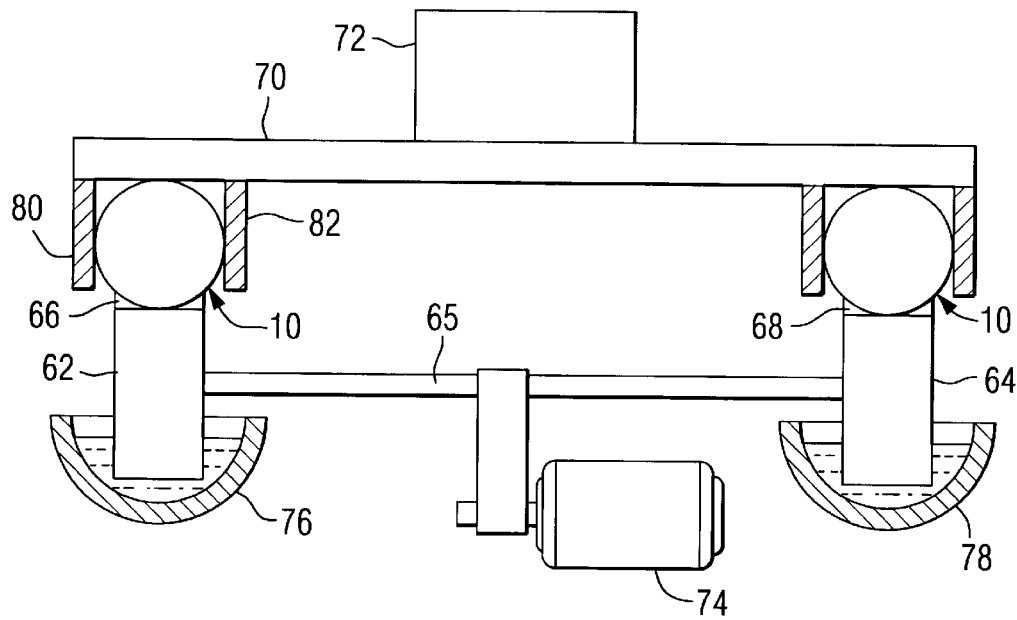
FIG. 3 shows a front view of a preferred method of this invention, where a plurality of fuel cell interconnects are coated and where the fuel cell is disposed horizontally, interconnect side down and applicators are disposed below the interconnects and where the fuel cells move above the applicators.

FIG. 3 illustrates the preferred embodiment of the method of this invention where multiple brushes 62 and 64 with their driving shaft 65 would contact multiple fuel cell interconnections 66 and 68. The fuel cells 10 would be mounted or supported on a moveable carriage 70 and slide 72 which would move or travel/translate and the brushes, turned by a stationary motor 74 (not shown in FIG. 2), would remain stationary underneath the fuel cell interconnections. This method shows the fuel cells disposed horizontally, interconnect side down with the applicator disposed below the interconnects. Grippers, shown as 80 and 82 would hold the fuel cells 10. This would eliminate need of the pump and electrolyte feed lines shown in FIG. 2 and allow the electrolyte reservoirs 76 and 78 to directly contact the brushes 62 and 64.

Figure 4:
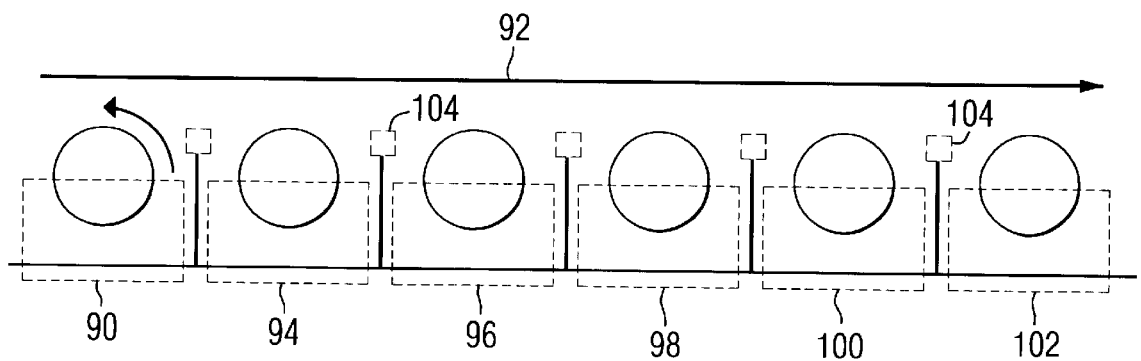
FIG. 4 is a schematic drawing of additional pre- and post-coating steps.

FIG. 4 shows a flow diagram of the method of this invention, where, the interconnection would pass over a fine wire brush at station 90 to clean and finely abrade and prepare the interconnect surface, preferably rotating opposite to the motion of the fuel cell 92. This could be followed by an acid etching station 94 utilizing, for example, boric acid or sulfamic acid or other surface activating or cleansing agent to prepare the interconnection surface better for the plating or coating station 96, as previously described. A first rinse station 98 and optional second rinse station 100 could follow concluding with a drying station 102, where wipers 104 could be used between all the stations.

This process provides excellent plating that is highly adherent, leak proof, dense (about 95% to 100% of theoretical density) and temperature stable and which does not introduce stresses into the fuel cell structure. This brush plating process is capable of electroplating metallic materials onto the surface of the SOFC interconnection at specified locations using programmable automation techniques, and the process minimizes or eliminates contact of other areas of the cell assembly with electrolytic material thereby reducing the potential for cell shorting during electroplating. The new process has the added benefit of reducing rinsing and cleaning requirements after brush plating is completed. In addition, this process can be readily adapted to flexible automation techniques for processing/re-processing cell assemblies through a commercial-scale production plant.

EXAMPLE

Several 1.8 meter full-length cells have been plated using a brush plating process similar to that shown in FIG. 2. A closed-end, 67 cm section of a solid oxide fuel cell, similar to that shown in FIG. 1, was placed on electrical test. After 50 hours of operation, cell performance was as follows:

Cell Voltage=0.611 V

Amps=81.7

After 117 hours of operation, cell voltage improved to 0.631 V at the same operating conditions. Subsequently, the cell completed nine thermal cycles without loss of performance. After testing, visual inspection showed no signs of plating or felt separation from the interconnection. Sections from the test cell were sent for microanalysis. The results confirmed that the plating remained intact and the plating-interconnection interface was normal.

Samples were sent for pull-tests. The average pull-strength of these samples was 1264.2 psi. (8710 k Pascals). Earlier pull-tests conducted on samples from a cell plated under standard conditions had an average mid-length pull-strength of 1079.8 psi (7439 k Pascals). This data indicate that the pull-strength of plating applied using the new processing technique is comparable to that achieved using standard processing methods.

Based on these results, the automated brush plating technique was shown to be technically viable.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalent thereof.

What is claimed is:

1. A method of electrolytically coating a metal deposit on the interconnection of a tubular solid oxide fuel cell comprising:
   (A) providing an axially elongated, tubular, hollow fuel cell comprising an outer fuel electrode, an inner air electrode and a solid electrolyte therebetween where the electrolyte defines an elongated exposed radial segment, said segment containing an electrically conductive interconnect material;
   (B) contacting the inside of the fuel cell with a cathode material without use of any liquid medium inside the fuel cell;
   (C) passing electrical current through a rotating brush applicator which contains liquid electrolyte solution containing a metal desired to be deposited on the interconnect material;
   (D) passing electric current from the rotating brush applicator, to the cathode inside of the fuel cell and contacting the interconnect with the electrolyte containing rotating brush applicator and coating all of the interconnect surface with electrolyte solution, so that the passage of electric current will cause metal from the electrolyte solution to coat the surface of the interconnect, where a moveable carriage supports the fuel cell and where the brush applicator is automatically rotated by a stationary motor to coat the interconnect surface.

2. The method of claim 1, where a plurality of fuel cells are provided and their interconnects coated, and there is an automatically controlled transfer of the brush contact along the length of the interconnect.

3. A method of electrolytically coating a metal deposit on the interconnection of a tubular solid oxide fuel cell comprising:
   (A) providing an axially elongated tubular fuel cell comprising an outer fuel electrode, an inner air electrode and solid electrolyte therebetween, and where the electrolyte defines an elongated exposed radial segment, said segment containing a gas impermeable electrically conductive interconnect material in electrical communication with a segment of said inner air electrode;
   (B) contacting the inside of the air electrode with a cathode material without use of any liquid medium inside the fuel cell;
   (C) passing electrical current through a rotating brush applicator which contains liquid electrolyte solution containing a metal desired to be deposited on the interconnect material;
   (D) passing electric current from the applicator to the cathode contacting the inside of the air electrode; and
   (E) contacting a first point of the exposed interconnect with the electrolyte containing rotating brush applicator and transferring the contact point to deposit electrolyte solution along the elongated axial length of the interconnect to a second point, so that the passage of electric current will cause metal from the electrolyte solution to coat the surface of the elongated axial length of the interconnect, and where transfer of the brush contact along the length of the interconnect is automatically controlled by a stationary motor rotating the brush and a moveable carriage supporting the fuel cell.

4. The method of claim 3, where a plurality of fuel cells are provided and their interconnects coated.

5. The method of claim 3, where the applicator is disposed above the interconnect and the fuel cell is disposed horizontally, interconnect side up.

6. The method of claim 3, where the applicator is disposed below the interconnect and the fuel cell is disposed horizontally, interconnect side down.

7. The method of claim 3, where the temperature of the electrolyte solution is from about 25° C. to about 70° C.

8. The method of claim 3, where the electrolyte solution contains nickel.

9. The method of claim 3, where the metal coating on the interconnect has a thickness of about 3 micrometers to about 15 micrometers.

10. The method of claim 3, including abrading the interconnect surface as a first step.

11. The method of claim 10, where immediately after the abrading step, the interconnect is cleaned and its surface activated.

* * * * *